(12) United States Patent
Woodworth (10) Patent No.: US 7,817,557 B2
(45) Date of Patent: Oct. 19, 2010

(54) METHOD AND SYSTEM FOR BUFFERING AUDIO/VIDEO DATA

(75) Inventor: Brian R. Woodworth, Irving, TX (US)

(73) Assignee: Telesector Resources Group, Inc., New York, NY (US)

( * ) Notice: Subject to any disclaimer, the term of this patent is extended or adjusted under 35 U.S.C. 154(b) by 589 days.

(21) Appl. No.: 11/467,977

(22) Filed: Aug. 29, 2006

(65) Prior Publication Data

US 2008/0056145 A1    Mar. 6, 2008

(51) Int. Cl.
H04L 1/00          (2006.01)
(52) U.S. Cl. .................. 370/236; 370/229; 370/230; 370/230.1; 370/231; 370/232; 370/235
(58) Field of Classification Search .............. 370/229, 370/230, 230.1, 231, 232, 235, 236
See application file for complete search history.

(56) References Cited

U.S. PATENT DOCUMENTS

| | | | |
|---|---|---|---|
| 5,689,800 A | 11/1997 | Downs | |
| 5,819,004 A | 10/1998 | Azadegan et al. | |
| 6,008,847 A | 12/1999 | Bauchspies | |
| 6,097,757 A * | 8/2000 | Boice et al. | ............ 375/240 |
| 6,212,206 B1 | 4/2001 | Ketcham | |
| 6,249,324 B1 | 6/2001 | Sato et al. | |
| 6,310,857 B1 * | 10/2001 | Duffield et al. | ............ 370/232 |
| 6,377,931 B1 | 4/2002 | Shlomot | |
| 2001/0047517 A1 | 11/2001 | Christopoulos et al. | |
| 2002/0024999 A1 | 2/2002 | Yamaguchi et al. | |
| 2003/0099298 A1 | 5/2003 | Rose et al. | |
| 2003/0208609 A1 | 11/2003 | Brusca | |
| 2004/0010585 A1 | 1/2004 | Jones et al. | |
| 2004/0049793 A1 * | 3/2004 | Chou | ........................ 725/87 |
| 2004/0139088 A1 | 7/2004 | Mandato et al. | |
| 2005/0122393 A1 | 6/2005 | Cockerton | |
| 2005/0155072 A1 | 7/2005 | Kaczowka et al. | |
| 2005/0157660 A1 * | 7/2005 | Mandato et al. | ............. 370/254 |

OTHER PUBLICATIONS

Wikipedia. Ranking. Sep. 25, 2009. <http://en.wikipedia.org/wiki/Ranking>.

* cited by examiner

*Primary Examiner*—William Trost, IV
*Assistant Examiner*—Ashil Farahmand (57) ABSTRACT

Systems and methods are described for transmitting audio and video messages between network terminals over a network. A communication link is established between a first network terminal and a second network terminal, and audio data and video data is transmitted concurrently over the link. During communication, the first network terminal acquires data representing the performance of the first network terminal and data representing the performance of the network. Based on negotiation between the first network terminal and the second network terminal and received performance data the at least one buffering parameter is determined and, if the parameter is within a predetermined range, the buffering parameter of the first network terminal is modified.

23 Claims, 4 Drawing Sheets

METHOD AND SYSTEM FOR BUFFERING AUDIO/VIDEO DATA

BACKGROUND INFORMATION

To transmit audio and video data over a computer network, the data is typically processed prior to transmission to maximize quality and minimize consumption of system resources. Issues of quality and resource consumption are of greater concern when audio and video are transmitted together in a network communication system (e.g., video conferencing, video telephony). Such "real-time" communication systems must maintain a constant stream of data between participants. As such, the demand for a device's resources may limit the audio and/or video quality provided by the system. Communication devices must, therefore, balance overall audio and video quality against several factors including: system performance, consumption of resources, and user preferences.

Two factors determining the overall quality of audio/video communications include latency and audio/video quality. In a communication system, latency is the delay measured from the time data is recorded at a source device, to the time the data is presented at a destination device. Within overall latency, network latency is the time required for data to traverse the network from the source to the destination. In addition, system latency arises from the time required for the source device to record, process, and transmit the audio/video data and, likewise, the time required for the destination device to receive, process and present the data.

Latency is particularly problematic in real-time communications systems because video and audio must be presented with as little delay as possible to enable natural interaction between participants. Excessive latency causes, among other things, cross-talk and echo that may severely impair the participants' ability to communicate effectively.

Latency is an even greater concern in packet-switched networks, such as the Internet. In a packet-switched network, data sent from a source device is divided into a plurality of packets that travel individually through the network to a destination device. Each packet, however, may arrive at the destination in a different sequence than the packets were originally sent. This difference may arise from a variety of factors, including: capacity of various routes, network congestion, re-routing, bottlenecks, and protocol incompatibilities. Additional latency is therefore introduced due to the time required for the destination terminal to re-sequence the data packets and reform the original data message. Even more problematic is that this latency may vary widely depending on the available in the devices and conditions present in the system at any particular time.

With regard to quality, audio and video data quality in a network communication system depends on several factors. Audio quality is related to, for example, the number of audio channels recorded by a device (e.g., stereo or monaural), the audio sampling rate, the resolution of the sample, and the method of data compression. Similarly, video quality is related to, for example, the number of video frames per second recorded, the color quality, the size of the video (i.e., the number of pixels in a frame), and the method of data compression. When the quality of audio and/or video is increased, the additional processing required consumes greater resources and, in turn, increases the overall latency in the communication system. For instance, if the level of audio/video quality exceeds a device's capacity to process the data, the encoded quality of audio and video may suffer due to loss of unprocessed data.

Quality is further affected by fluctuations in the audio/video presentation, commonly referred to as "jitter." In a packet-switched network, jitter may result from data packets being delayed in transmission over the network, such that a complete audio/video message cannot be assembled before presentation to the user. As a result, segments of the audio and video may not be presented and, instead, cause audio and/or video to jitter, thereby detracting from the participants' natural communication. Indeed, small amounts jitter in the presentation of audio may make the participants' conversation unintelligible. In comparison, to a limited degree, lost portions of video may be tolerated. Accordingly, in a network communication system is determined based primarily on audio quality.

To compensate for jitter, a reserve pool of data may be stored in a data buffer to provide a steady supply of data, while other data is processed. If the buffer is too small to compensate for delay in the system (e.g., due to slow processing), the reserve of packets stored in the buffer may become depleted and result in jitter as, for example, the data buffer intermittently fills and depletes. On the other hand, if buffer size is increased to provide sufficient reserve to avoid jitter, the increased buffering introduces additional latency, thereby detracting from overall quality of communication.

Thus, as discussed above, the quality of an audio and video signal can be increased in a network communication system. But an increase in quality may be offset by an undesirable increase in latency. Accordingly, a network communication system must balance latency with audio and video quality to provide highest overall quality for a given set of conditions.

DETAILED DESCRIPTION OF PREFERRED EMBODIMENTS

The following description refers to the accompanying drawings in which the same numbers in different drawings represent similar elements unless otherwise represented. The preferred embodiments set forth in the following description do not represent all possible embodiments consistent with the claimed invention. Instead, they are merely examples of systems and methods consistent with certain aspects related to the invention.

Preferred methods and systems described herein allow for improved communication of audio and video between two or more terminal locations of a network. In the one embodiment, a first network terminal (e.g., source terminal) provides, at least, audio and video data to a second network terminal (e.g., destination terminal). The source terminal monitors the performance of the terminal hardware, the network and/or user preferences and, based on these factors, dynamically modifies audio/video encoding and/or buffering parameters for audio and/or video to avoid distortion of the audio presented at the destination terminal.

Figure 1:
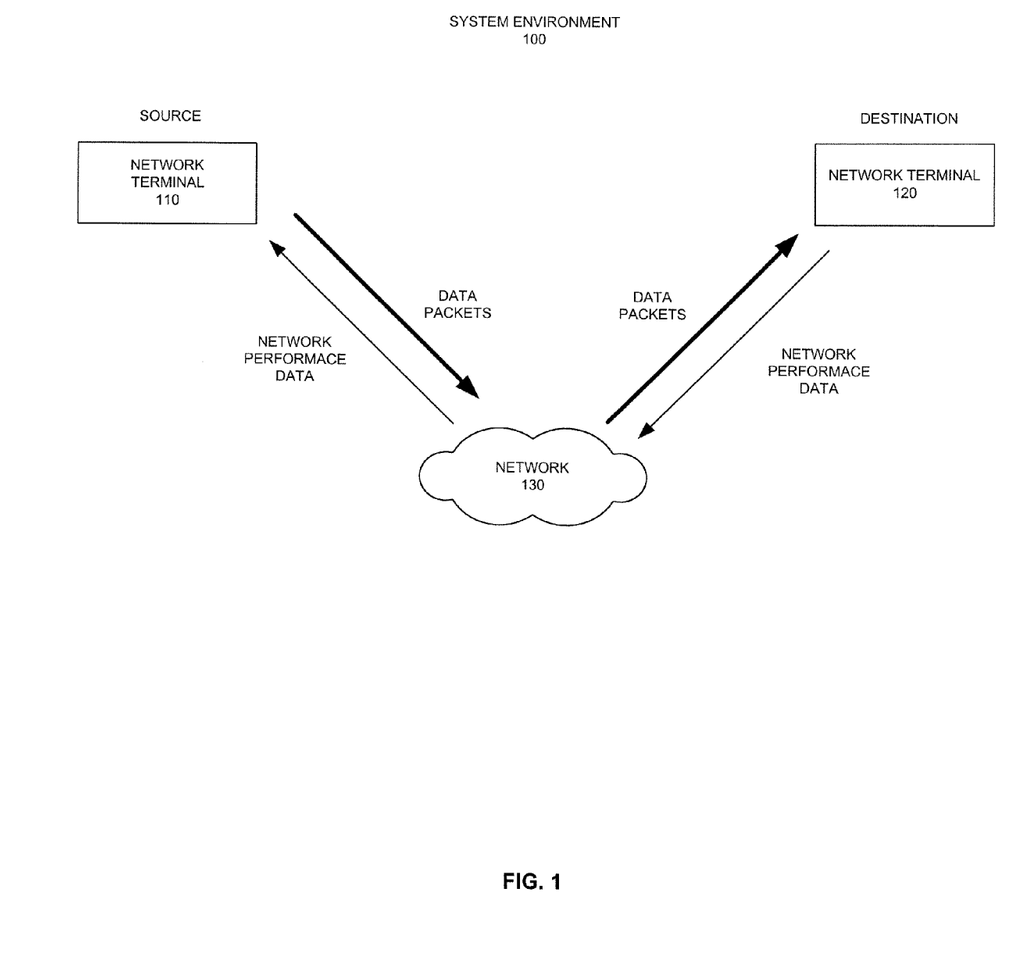
FIG. 1 illustrates a block diagram of an exemplary system environment consistent with certain aspects related to the present invention.

FIG. 1 is a block diagram showing a system environment 100 which may be used in practicing the preferred embodiments described herein. System environment 100 may include, at least, first network terminal 110, second network terminal 120, and network 130.

Network terminals 110 and 120 may include components consistent with computing systems such as processors, memory and input/output devices that enable a user to provide audio and video to a network communication system. Network terminals 110 and 120 may be implemented using one or more generic computer systems including, for example, personal computer, minicomputer, microprocessor, workstation, server or similar computer platforms. Alternatively, network terminals 110 and 120 may encompass or be embedded within a specialized computing system including, for example, a set-top box, video telephone, video game console, a portable telephone, personal digital assistant, or portable game device. Network terminals 110 and 120 may be located in a user's home, at a business, in a public kiosk or in a portable device. Furthermore, network terminals 110 and 120 may be a owned by a user or may be provided to the user by a communications service provider, for example, in conjunction with television broadcast service, telephone service, broadband data (e.g., Internet) service, or other communication services.

Network 130 may be one or more communication networks that communicate data between network terminals 110 and 120. Network 130 may be any type of network for communicating data, including text, pictures, voice and video. In some instances, network 130 may possess sufficient bandwidth to transmit real-time audio or video between network terminals 110 and 120. Network 130 may be a shared, public, private, or peer-to-peer network encompassing a wide or local area including an extranet, an Intranet, the Internet, a Local Area Network (LAN), Wide Area Network (WAN), public switched telephone network (PSTN), Integrated Services Digital Network (ISDN), radio links, cable television network, satellite television network, terrestrial wireless network, and any other form of wired or wireless communication networks.

Network 130 may be compatible with any type of communications protocol used by the components of the system environment to exchange information, such as Ethernet, ATM, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA) or peer-to-peer protocols. The providers of network 130 may be, for instance, an Internet Service Provider (ISP), a landline telephone carrier, a cell phone system provider, a cable television provider, a satellite television provider, an operator of a WAN, an operator of LAN, or an operator of point-to-point network.

FIG. 1 further illustrates the flow of data in system environment 100. Data may be transmitted from source terminal 110 over network 130 to destination terminal 120. Data may be encoded in packets comprising a set of computer-readable data bits including, among other information, a portion of a data message that, when properly assembled in combination, forms a complete data message. A packet may contain message data representing, for instance, video information, audio information, text, graphics or the like. In a real-time communication system, for example, the message may include digital audio data comprising a portion of a conversation that is presented to a user at the destination network terminal 120.

As illustrated in FIG. 1, system environment 100 includes two network terminals 110 and 120, and network 130. As is readily apparent, other embodiments may include a plurality of network terminals or other network-enabled devices linked over multiple networks by a plurality of network exchange points sharing data between the networks. Furthermore, for the purposes of explanation, FIG. 1 illustrates data flowing only from source terminal 110 to destination terminal 120. Regardless, it is to be understood that both terminals 110 and 120 may send and receive at least audio and video data.

Figure 2:
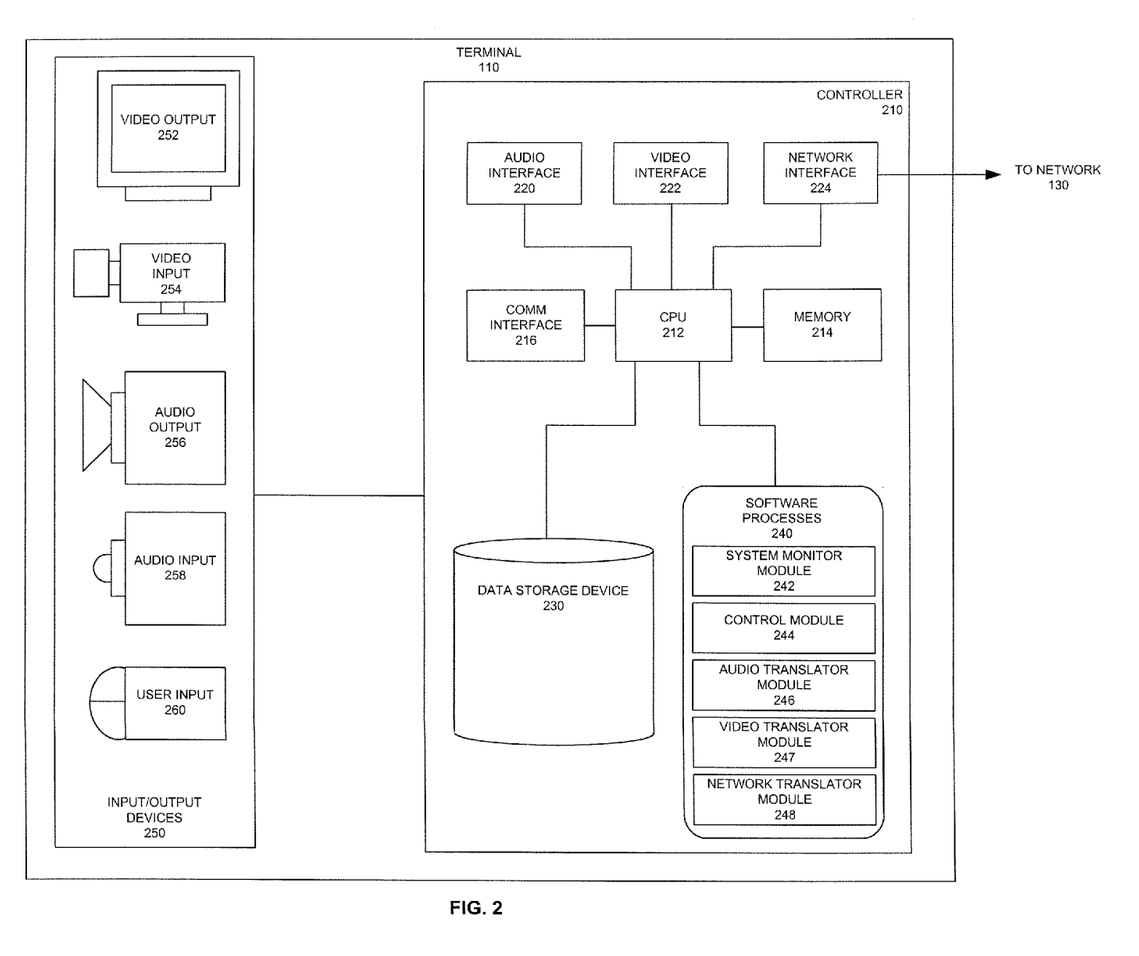
FIG. 2 illustrates a block diagram of an exemplary network terminal consistent with certain aspects related to the present invention.

FIG. 2 provides a block diagram showing aspects of an exemplary network terminal 110 including components for receiving, displaying, processing and transmitting audio and video data, communicating over network 130, and certain other components. Network terminal 110 may include controller 210 and input/output devices 250. Controller 210 may be one or more processing devices that execute computer instructions stored in one or more memory devices to provide functions and features such as described herein. Controller 210 may include, for example, central processing unit (CPU) 212, memory 214, communication interface 216, audio interface 220, video interface 220, and network interface 224.

CPU 212 provides control and processing functions for network terminal 110 by processing instructions and data stored in memory 214. CPU 212 may be any conventional controller such as off-the-shelf microprocessor (e.g., INTEL PENTIUM), or an application-specific integrated circuit specifically adapted for network terminal 110. CPU 212 may also include, for example, coprocessors, memory, registers and/or other processing devices as appropriate.

Memory 214 may be one or more memory devices that store data, operating system and application instructions that, when executed by CPU 212, perform the processes described herein. Memory 214 may include semiconductor and magnetic memories such as random access memory (RAM), read-only memory (ROM), electronically erasable programmable ROM (EEPROM), flash memory, optical disks, magnetic disks, etc. When user terminal 110 executes an application installed in data storage device 230, CPU 212 may load at least a portion of instructions from data storage device 230 into memory 214.

Communications interface 216 provides one or more interfaces for transmitting and/or receiving data into CPU 212 from external devices, including any of input/output devices 250. Communications interface 226 may be, for example, a serial port (e.g., RS-232, RS-422, universal serial bus (USB), IEEE-1394), parallel port (e.g., IEEE 1284), or wireless port (e.g., infrared, ultraviolet, or radio-frequency transceiver). In some embodiments, audio, video and/or network data may be exchanged with CPU 212 through communications interface 216.

Audio interface 220 may be any device for enabling audio data exchange between CPU 212 and audio devices 256 and/or 258. Audio interface 220 may perform functions such as buffering, filtering, biasing, and other conditioning of signals exchanged between controller 210 and audio input 258. In addition, audio interface 220 may include an analog-to-digital converter for encoding analog audio signals produced by audio input device 258 into digital data. Similarly, audio interface 220 may include a digital-to-analog converter for converting digital audio data into analog audio signals for audio output device 256.

Video interface 222 may be any device for enabling video data exchange between CPU 212 and video devices 252 and/or 254. Video interface 222 may perform functions such as filtering, biasing, and other conditioning of signals exchanged between video input 254 and controller 210. In addition, video interface 222 may include an analog-to-digital converter for converting analog video signals produced by video input device 254 into digital data. Similarly, video interface 222 may include a digital-to-analog converter for converting digital video data from CPU 212 into analog video signals for video output device 252.

Network interface 224 may be any device for sending and receiving data between CPU 212 and network 130. Network interface 224 may, in addition, modulate and/or demodulate data messages into signals for transmission over network 130 data channels (over cables or wirelessly). Further, network interface 224 may support any telecommunications or data network including; for example, Ethernet, WiFi, token ring, ATM, or ISDN. Alternatively, network interface 224 may be an external network interface connected to CPU 212 though communications interface 216.

Data storage device 230 includes computer-readable instructions and data for network terminal 110 to provide and/or receive audio and/or video data over network 130. Data storage device 230 may include software such as program code for network communications, operating system, kernel, device drivers, configuration information (e.g., Dynamic Host Configuration Protocol configuration), a web browser, and any other software that may be installed on network terminal 110. For example, data storage device 230 may store a user interface that may be accessible using input/output devices 250 and allow a user of terminal 110 to access the functionality provided therein. Where the terminal 110 is implemented as a set-top box, the user interface may include such features as a program guide, channel selector, pay-per-view or video-on-demand selector, and an interface to control the various video recording and playback control options. In the preferred embodiments, such a user interface includes an access to the network communication facilities described herein, thus allowing a user of user terminal 110 to select the network communication facility using, for example, the user input devices 260.

Input/output devices 250 include, for example, video output 252, video input 254, audio output 256, audio input 258 and user input 260. Video output 252 may be any device for displaying visual information such as a cathode ray tube (CRT), liquid crystal display (LCD), light emitting diode display (LED), plasma display, or electroluminescent display. Video input device 254 may be an analog or digital camera, camcorder, or other image-capture device. Audio output device 256 may be a speaker, headphone, earpiece, or other audio transducer that converts electrical signals into audible tones. Audio input 258 device may be a microphone or other audio transducer that converts audible sounds into electrical signals and may be a stand-alone device or incorporated in other devices such as a telephone handset. User input device 260 may be any conventional device for communicating user's commands to network terminal 110 including, for example, keyboard, keypad, computer mouse, touch screen, trackball, scroll wheel, joystick, television remote controller, or voice recognition controller. Signals from input/output devices may also be exchanged with CPU 212 through communications interface 224.

As further illustrated in FIG. 2, source terminal 110 may execute software processes 240 associated with providing audio and video data to destination terminal 120, as further described below. In addition to known operating system and/or software applications, CPU 212 may execute a system monitor module 242, control module 244, audio translator module 246, video translator module 247 and network translator module 248.

System monitor module 242 may execute instructions and data for monitoring the system performance of source terminal 110 and, in particular, controller 210. System performance may be measured from various components associated with controller 210 including, CPU 212, memory 214, and network interface 224. Measurements may be provided by system monitor module 242 and provided to control module 244 as a one or more values representing performance (i.e., metrics). Performance metrics may provided individually to control module 244 or, one or more of such metrics may be combined into a single metric representing a combined measure of system performance. System monitor module 242 may measure CPU 212 usage based on, for example, the number of active software processes 240, the number of process objects being processed by CPU 212 and/or the percentage available processing capacity remaining in CPU 212. System monitor module 242 may measure memory 214 usage based on, for example, the availability of one or more of physical memory, kernel memory or virtual memory. Further, with respect to each, memory usage may measure different aspects of memory usage including total memory available and/or peak memory usage. Finally, system monitor module may measure network 130 usage based on available network interface 224 capacity, such as percentage of maximum throughput. Other measures of terminal's 110 performance may measured as well, as is well known.

Control module 244 may be computer-executable instructions that, when executed by controller 210, is responsible for controlling, maintaining, and performing calculations to determine parameters for controlling, at least, audio translator module 246, and video translator module 247. Control module 244 may also exchange data with other software processes 240 including system performance data from system monitor module 242 and network performance data from network translator module 248. Further, control module may access user preference data 232 stored, for example, in data storage device 230.

Audio translator module 246 may be computer-executable instructions that, when executed by controller 210, translates audio data exchanged between audio interface 220 and CPU 212. Audio translator module 246 may include a compression-decompression software ("CODEC") that encodes and/or decodes audio data to/from one or more of several format including, for example, MP3, AIFF (Audio Interchange File Format), WAV, FLAC (Free Lossless Audio Codec), Windows Media Audio, or AAC (Advanced Audio Coding).

Audio translator module 246 may further be associated with an audio data buffer for temporarily storing audio data received by audio translator module 246. The characteristics of the audio buffer may be set by audio translator module 246 based on parameters determined by control module 244. Alternatively, audio buffer parameters may be controlled directly by control module 244.

Video translator module 247 may be computer-executable instructions that, when executed by controller 210, translates video data exchanged between video interface 222 and CPU 212. Video translator module 247 may include a compression-decompression software ("CODEC") encodes and/or decodes video data to/from one or more of several format including, for example, MPEG, INDEO, CINEPAK or VIDEO1.

Video translator module 247 may further be associated with an video data buffer for temporarily storing video data received by video translator module 247. The characteristics of the video buffer may be set by video translator module 247 based on parameters determined by control module 244. Alternatively, video buffer parameters may be controlled directly by control module 244.

Network translator module 248 may be computer-executable instructions and data that, when executed by controller 210, translates data sent and received from network 130. Network translator module 248 may exchange data with at least control module 244, audio translator module 246, video translator module 247, and network interface 224. When sending audio and video to destination terminal 120, network translator module 248 may receive audio and video data and translate the data into a format for transmission over network 130 by network interface 224 in accordance a network data protocol (such as those mentioned previously). For instance, network translator module 248 may translate compressed audio and video data into packets according to the TCP/IP protocol for transmission over a packet switched network, such as the Internet. Conversely, when receiving audio and video data from network 130, network translator module 248 may receive data from network interface 224 and translate the data into audio and video data that is passed, respectively, to audio translator module 246 and video translator module 247 for decoding and presentation by input/output devices 250.

The configuration or relationship of the hardware components and software modules illustrated in FIG. 2 is exemplary. The components of network terminal 110 may be independent components operatively connected, or they may be integrated into one or more components including the functions of some or all of components 210-260. For example, input/output devices 250 may be a plurality of independent devices within separate housings detachably connected to a generic controller, such as a personal computer or home entertainment system. In other implementations, controller 210 and input/output devices 250 may be integrated within a single housing such as a portable telephone. Different configurations of components may be selected based on the requirements of a particular implementation of a network terminal giving consideration to factors including, but not limited to, cost, size, speed, form factor, capacity, portability, power consumption and reliability, as is well known. Moreover, terminals useful in implementing the preferred embodiments may have greater or fewer components than illustrated in FIG. 2. Network terminal 110 may include functionality directed towards other capabilities. For example, network terminal 110 may be a set-top box providing broadcast video. In such a case, the network terminal may include components such as a radio-frequency (RF) interface to receive and transmit broadcast signals. The RF interface may be further connected to other known components for tuning and processing RF modulated audio/video signals, which may also be connected to audio interface 220 and/or video interface 222. Likewise, if network terminal 110 is a mobile telephone, then terminal 110 may include other components such as an RF interface to receive and transmit wireless communications signals, which may be further connected to other known components to process such wireless communications signals, and which may be further connected to network interface 224 to provide connectivity to network 130.

Although network terminal 120 is not illustrated in FIG. 2, terminal 120 may include the same or similar components and functionality as that described above for network terminal 110 and illustrated in FIG. 2. As well, FIG. 2 depicts software modules for execution by CPU 212 and such modules may be implemental in hardware, and/or a combination of hardware and software, adopted for use with CPU 212 or a different CPU based on the particular configuration.

Figure 3:
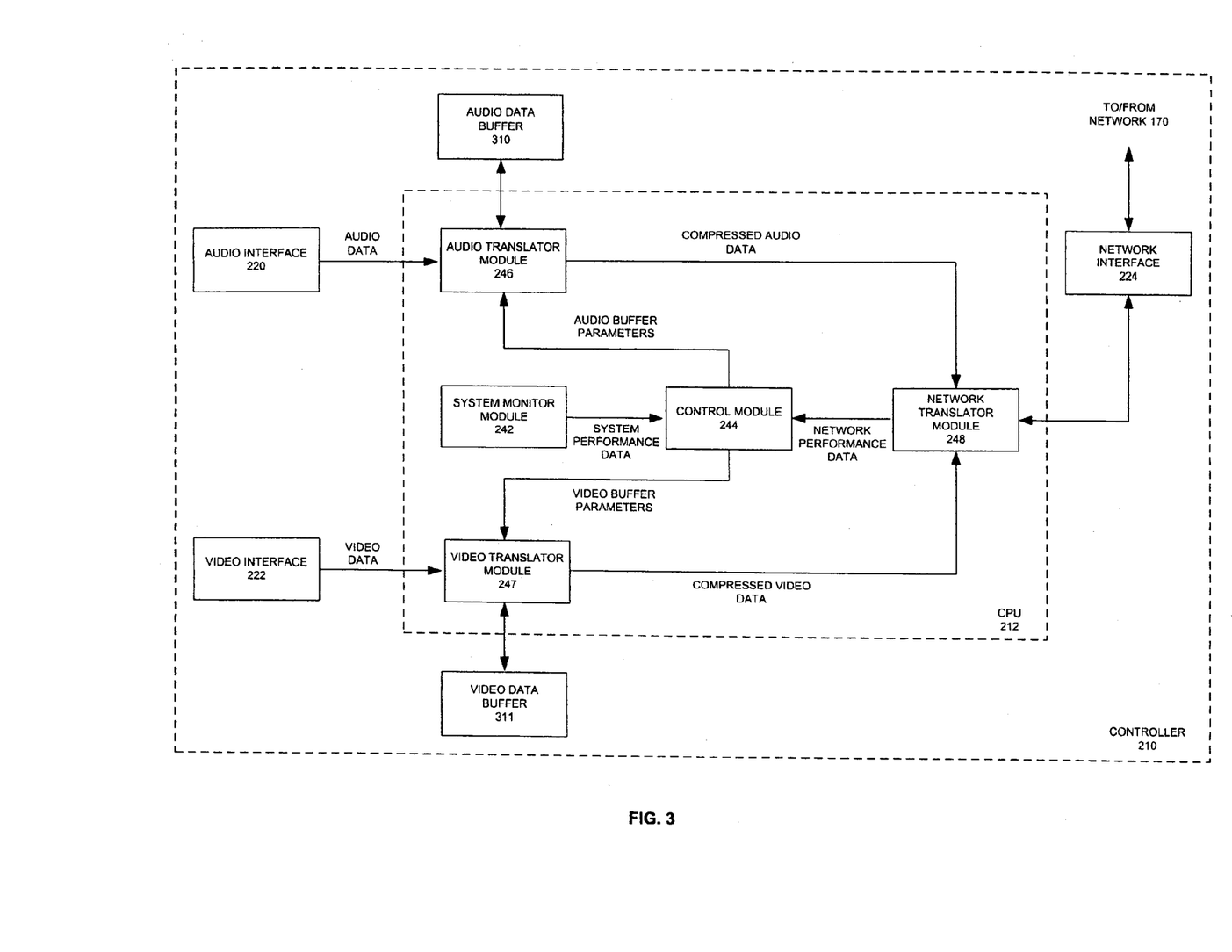
FIG. 3 illustrates a functional diagram of an exemplary network terminal consistent with certain aspects of data related to the present invention.

With reference to FIG. 3, the functional block diagram illustrates the processing of audio and video data by source terminal 110 for transmission over network 130 to destination terminal 120. Audio data may be recorded by audio input device 258 and then passed to audio interface 220 where it may be, for example, buffered, signal conditioned and/or converted to a digital data stream. Subsequently, the audio data may be passed to audio translator module 246 for data compression and/or other signal processing. While awaiting processing by audio translator module 246, audio data received from the audio interface 220 may be stored temporarily in audio data buffer 310. For instance, audio input device 258 may receive data signals encoding the conversation of a first user in a video conference. Data buffer 310 may temporarily store the stream of audio data while other information is compressed into MP3 format by audio translator 246.

Audio data buffer 310 may be comprised of a portion of computer memory 214 (e.g., RAM) or, alternatively, it may be a separate computer memory dedicated solely to buffering audio data received by audio translator module 246. Parameters of audio data buffer 310 may be changed dynamically by audio translator module 246 including, for instance, buffer size, buffer rate, and buffer delay. As will be explained in more detail below, these audio data buffer 310 parameters may be changed based on audio parameters determined by control module 244. After processing by audio translator module 246, the compressed audio data may be passed to network translator module 248.

Similar to the audio data, video data may be recorded by video input device 254 and then passed to video interface 220 where it may be, for example, buffered, signal conditioned and/or converted to a digital data stream. Subsequently, the video data may be passed to video translator module 247 for compressing and/or other signal processing. While awaiting processing by video translator module 247, video data received from the video interface 222 may be stored temporarily in video data buffer 311. For instance, video input device 258 may receive data signals encoding the conversation of a first user in a video conference, and video data buffer 311 may temporarily store the stream of video data while other information is being processed.

Video data buffer 311 may be comprised of a portion of computer memory 214 (e.g., RAM) or, alternatively, it may be a separate computer memory dedicated solely to buffering video data received by video translator module 247. Parameters of video data buffer 311 may be changed dynamically by video translator module 247 including, for instance, buffer size, buffer rate, and buffer delay. As will be explained in more detail below, these video data buffer 311 parameters may be changed based on parameters determined by control module 244. After processing by video translator module 247, the compressed video data may be passed to network translator module 248.

Network translator module 248 may exchange data between network 130 and, at least, control module 244, audio translator module 246 and video translator module 247. For instance, audio and/or video data may be provided by network translator module 248 for translation into data packets for transmission over a packet-switching network. In some embodiments, network translator module 248 may packetize the audio and video data in accordance with the RTP (real-time transport protocol) for real-time streaming of the audio and video data over the network. Further, network translator module 248 may timestamp and synchronize the audio and video data for proper reassembly at destination terminal 120 and/or encrypt the data to enable confidentiality and message authentication.

Further, network translator module 248 may receive data from network interface 224. In accordance with the preferred embodiments disclosed, data may include, at least, audio and video data sent by network terminal 120. As above, the audio and video data may be received in packets encoded using the RTP. Network translator module 248 may de-packetize the received data and forward the audio and/or video to audio translator module 246 and video translator module 247, respectively, for decompression and presentation by input/output devices 250.

Network translator module 248 may also receive data describing the performance of network 130. Network 130 performance data may include, among other information, a count of packets sent, number of packets lost, percentage of packets lost, delay between packets, an estimation of jitter and/or video delay. For example, network performance data may be received from destination terminal 120 within a control packet in accordance with the RTP. Network translator module 248 may subsequently provide the received performance data to other software modules, including control module 244 for use in determining audio and video buffering parameters.

Based on data including user preference data 232 from data storage device 230, system performance data from system monitor module 242 and network performance data from network translator module 248, control module 244 may determine audio and/or video data buffering parameters for audio translator module 246 and video translator module 247. Buffering parameters may be modified dynamically during communication between network terminals 110 and 120 by control module 244 in response to changes in the state of first network terminal's performance, the state of the network's performance and/or user-preference data 232.

Figure 4:
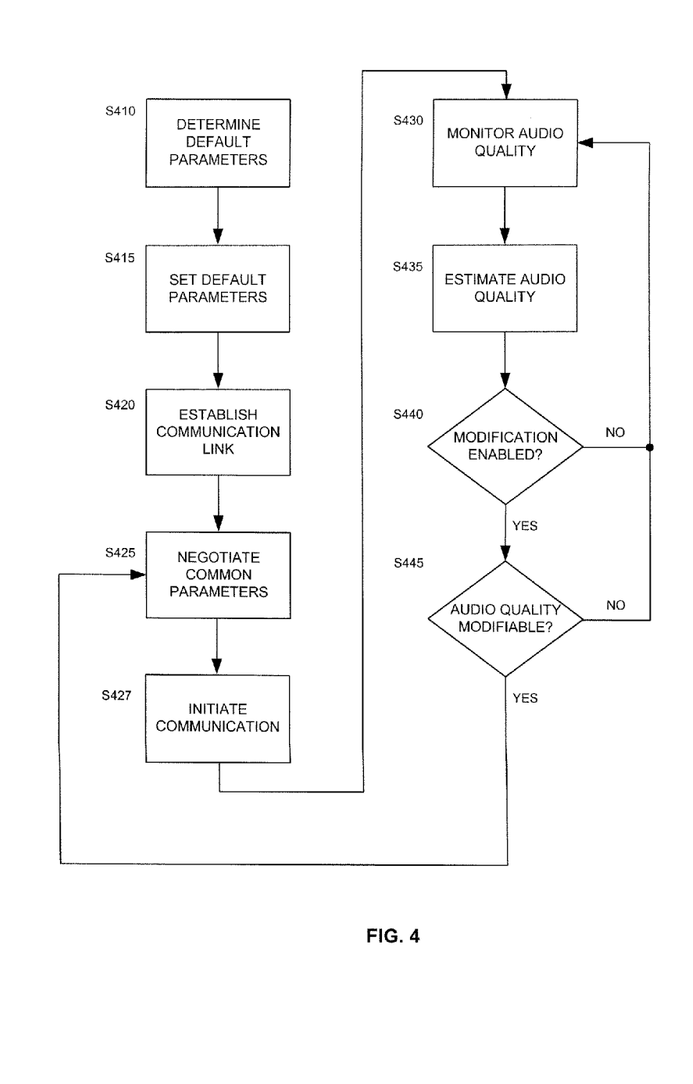
FIG. 4 illustrates a flowchart exemplifying aspects related to the present invention.

With reference to FIG. 4, the flow chart illustrates an exemplary process for controlling the transport of audio and video communicated between terminals 110 and 120. The transport process is capable of balancing resources to allow user's preferences in video quality, and network and system resource consumption.

Initially, control module 244 determines default parameters for audio translator module 246 and video translator module 247, including parameters defining audio/video encoding quality and buffer control. Because different types of communications may support different initial configurations, the default parameters may change depending on the relationship between terminals 110 and 120. For instance, a long-distance video conference between five participants may require different default parameters then a local video-telephone call between two participants. Accordingly, control module 244 may determine an appropriate set of initial buffer control values based on a given set of circumstances. Default parameters may be based on one or more of number of participants, distance between participants, network terminal type, network terminal video capability, network terminal audio capability, network type, network transmission rate and network transmission protocol. Default values for different initial configurations may be stored in data storage device and referenced by buffer control module 244 based on, for example, a look-up table or, alternatively, may be determined from an algorithm.

After determining default parameters, control module 244 may instruct audio translator module 246 and video translator module 247 to set the default parameters for encoding and decoding audio/video data. (S415) Audio translation parameters may include: number of channels (mono or stereo), sampling rate (2000 Hz-44100 Hz), sample size (4 bit-16 bit), compression method (none, PCM, ADPCM, GSM, MPEG-3, WMA). Audio buffer parameters may include one or more of buffer size, buffer rate and/or buffer delay. Video parameters may include: frames per second (1-50), color quality (1 bit-24 bit), (frame size: 80×60-640×480), and compression method: (none, MPEG-4, MPEG-2, WMV). Video buffer parameters may also include one or more of buffer size, buffer rate and/or buffer delay.

When determining default parameters, control module 244 may also consider user-preferences. That is, a user of network terminal 110 or 120 may input audio/video communication preferences that may be stored in data storage device 230 for reference by control module 244. User preferences may be considered by control module 244 when determining initial parameters, as well as when control module 244 negotiates modified parameters. For example, user may set a lower and upper thresholds for audio/video data quality. Alternatively, user preference may be based on user's prior activities. Based on such user-preferences, control module 244 may refuse to set and/or modify parameters that fall outside the user-defined threshold. Furthermore, user-preferences may include a user's preference for modifying audio/video parameters during a communication. If a user, for instance, prefers that audio/video parameters not be changed during a communication, then control module 244 will not modify and/or negotiate new parameters during a communication with destination terminal 120.

Control module 244 may also cause source terminal 110 to establish communication link with destination terminal 120 (S420). Once communication is established, terminals 110 and 120 negotiate a common set of communication parameters. (S425) In particular, terminal 110 and terminal 120 may determine a set of baseline parameters for encoding audio and video data. Further, terminals 110 and 120 may determine minimum and maximum thresholds defining a range over which audio/video parameters may vary around the baseline parameters. The negotiated parameters may be based on each of terminals' 110 and 120 current processing capacity, network performance and/or user-preferences.

Communication between terminals 110 and 120 may be initiated after the negotiation of parameters has been completed by control module 244. (S427). First, control module 244 informs audio translator module 246 and video translator module 247 of the negotiated parameters. According to these parameters, audio translator 246 and video translator 247 set audio buffer 310 and video buffer 311, respectively. Next, as communication commences, audio translator module 246 begins receiving audio data from audio interface 220 and, temporarily stores the data in audio buffers 310 for processing by audio translator module 246. Likewise, video translator module 247 may begin receiving video data from video interface 222, which it stores temporarily in video data buffer 311. The audio translator module 246 and video translator module 247 process the audio and video using the negotiated parameters and begin feeding the network translator module 248 with audio and/or video data for transmission over network 120.

Once parameters are set and communications begin and data begins arriving at the destination terminal 120, performance measurements are made. While communication between 110 and 120 is in progress, controller module 244 monitors the incoming data for quality. (S430) Performance data is received by controller module from at least system monitor module 242 and network translator module 248. As discussed previously, system monitor module 242 may provide one or more metrics representing system performance including performance of CPU 212, memory 214 and/or network interface 224. Additionally, network performance data received from destination terminal 120, for example, may include information regarding packets lost, packet delay, jitter, audio quality and video quality.

Based on performance data, control module 244 may estimate current audio and/or video quality. (S435) For instance, control module 244 may execute an algorithm that calculates modified parameters based on predetermined relationship between the buffer parameters and, at least, system performance data and network performance data. Alternatively, audio buffer parameters may be determined using one or more predefined look-up tables correlating buffer parameter values with, at least, system performance data and network performance data.

Control module 244 then determines, based on the estimate of current state of audio and/or video quality, whether parameters may be modified. (S440) Factors used in the determination may include: (i) whether quality deteriorated or is it about to deteriorate beyond a defined threshold, (ii) whether the deterioration occurred for a defined amount of time; and/or (iii) whether changes to parameters would be within the ranges defined by user-preferences and/or negotiated with destination terminal 120. These factors may be balanced using a weighted algorithm. Alternatively, Rather than an algorithm, the determination may be made based on one or more look-up tables relating performance metrics with stored sets of audio/video communication parameters.

If control module 244 determines that parameters may be modified and user-preferences enable modification of parameters during communication (S440), the control module 244 may attempt to negotiate modified parameters with destination terminal 120. (S425) For example, new parameters may provide for a reduced frame rate, frame size, color quality, etc. Conversely, if controller module 244 detects that the connection quality exceeds defined parameters (S435) and the user has enabled modification (S440), control module may determine to negotiate modified parameters with destination terminal 120 providing higher quality audio and/or video. If not, terminal 110 will continue with current parameters. (S445)

For purposes of explanation only, certain preferred embodiments of the present invention are described herein with reference to the components illustrated in FIGS. 1-4. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Embodiments described herein may be implemented in various environments. Such environments and related applications may be specifically constructed for performing the various processes and operations described herein, or they may include a general purpose computer or computing platform selectively activated or configured by program instructions to provide the described functionality. The processes disclosed herein are not inherently related to any particular computer or other apparatus, and may be implemented by a suitable combination of hardware, software, and/or firmware. For example, various general purpose data processing machines may be used with programs written to implement portions of the preferred embodiments described herein; or it may be more effective, convenient and/or cost-effective to construct a specialized apparatus or system to perform the described methods or techniques.

Embodiments described herein may be further implemented in processor-readable media that include program instructions and/or data configured to perform the various methods described herein. The program instructions may be those specially designed and constructed, or they may be of the kind generally well-known. Examples of program instructions include, for example, machine code such as produced by a compiler, files containing high-level code executable by a computer via an interpreter, or levels of abstraction therebetween.

Embodiments also within the scope of the present invention include computer readable media having executable instructions or data fields stored thereon. For brevity, computer readable media having computer executable instructions may sometimes be referred to as "software" or "computer software." Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above can also be included within the scope of computer readable media. Executable instructions exemplarily comprise instructions and data which cause a general purpose computer, special purpose computer, or special purpose processing device to perform a certain function or group of functions.

The preferred embodiments have been described in the general context of computer-executable instructions, such as program modules, being executed by a "computer." Generally, program modules include routines, programs, objects, components, data structures, etc. that perform particular tasks or implement particular abstract data types. Moreover, the embodiments of the present invention may be practiced with other computing system configurations other than a computer, including hand-held devices, multiprocessor systems, microprocessor-based or programmable consumer electronics, network PCs, minicomputers, computer clusters mainframe computers, and the like. Since the invention may be practiced in distributed computing environments, tasks may also be performed by remote processing devices that are linked through a communications network. In a distributed computing environment, program modules may be located in both local and remote memory storage devices.

Further, the sequence of events described in FIG. 4 is exemplary and not intended to be limiting. Thus, other method steps may be used, and even with the method depicted in FIG. 4, the particular order of events may vary without departing from the scope of the present invention. Moreover, certain steps may not be present and additional steps may be implemented in FIG. 4. Also, the processes described herein are not inherently related to any particular apparatus and may be implemented by any suitable combination of components.

The foregoing description of preferred embodiments consistent with the present invention does not represent a comprehensive list of all possible embodiments or all variations of the embodiments described. The description of only some embodiments should not be construed as an intent to exclude other embodiments or variations thereof. Indeed, the foregoing description of preferred embodiments will likely provide understanding of how to implement the invention in the appended claims in many other ways, using equivalents and alternatives that do not depart from the scope of the following claims. None of the components described in the implementations should be considered essential to the present invention.

What is claimed is:

1. A method performed by a first terminal connected to a second terminal over a network comprising the steps of:
   receiving input audio/video data;
   setting a value of a buffering parameter;
   buffering the received audio/video data based on the buffering parameter value;
   encoding the buffered audio/video data based on the buffering parameter value;
   transmitting the encoded audio/video data over the network to the second terminal;
   receiving first performance data representing a capacity of a computing resource of the first network terminal;
   receiving second performance data representing performance of the transmission of the encoded audio/video data over the network; and modifying the buffering parameter value based on the first performance data and the second performance data, wherein modifying the buffering parameter value includes negotiating the buffering parameter value with the second terminal.

2. The method of claim 1, wherein the network is a packet-switched network.

3. The method of claim 1, wherein the second performance data represents at least one of: data packets lost, data packet delay, jitter, audio quality, and video quality.

4. The method of claim 1, wherein the first performance data represents at least one of: processor usage, memory usage, and network usage.

5. The method of claim 1, wherein the buffering parameter controls at least one of: buffer size, buffer rate, and buffer delay.

6. The method of claim 1, further comprising, prior to transmitting the audio/video data, setting the buffering parameter value to a default value.

7. The method of claim 6, wherein the default buffering parameter value is set based on at least one of: number of participants, distance between participants, network terminal type, network terminal video capability, network terminal audio capability, network type, network transmission rate, and network transmission protocol.

8. The method of claim 1, wherein the first terminal stores data representing at least one user-preference, and the audio/video data is not encoded based on the buffering parameter value if the at least one user-preference forbids modification of the buffering parameter value.

9. The method of claim 1, wherein the first terminal stores data representing at least one user-preference specifying a range for the buffering parameter value, and the audio/video data is not encoded based on the buffering parameter value if the negotiated buffering parameter value is outside the range specified by the at least one user-preference.

10. The method of claim 1, wherein modifying the buffering parameter value further includes negotiating a range for the buffering parameter value with the second terminal.

11. The method of claim 10, wherein the audio/video data is not encoded based on the buffering parameter value if the negotiated buffering parameter value is outside the negotiated range.

12. A system, comprising:
a network communicatively coupled to a plurality of network terminals including a first network terminal and a second network terminal, wherein the first network terminal is configured to:
receive input audio/video data;
set a value of a buffering parameter;
buffer the received audio/video data based on the value of the buffering parameter;
encode the buffered audio/video data based on the value of the buffering parameter;
transmit the encoded audio/video data over the network to the second network terminal;
receive first performance data representing a capacity of a computing resource of the first network terminal;
receive second performance data representing performance of the transmission of the encoded audio/video over the network; and
modify the buffering parameter value based on the first performance data and the second performance data,
wherein modifying the buffering parameter value includes negotiating the buffering parameter value with the second network terminal.

13. The system of claim 12, wherein the network is a packet-switched network.

14. The system of claim 12, wherein the second performance data represents at least one of: data packets lost, data packet delay, jitter, audio quality, and video quality.

15. The system of claim 12, wherein the first performance data represents at least one of: processor usage, memory usage, and network usage.

16. The system of claim 12, wherein the buffering parameter value controls at least one of: buffer size, buffer rate, and buffer delay.

17. The system of claim 12, wherein the first network terminal is further configured to set the buffering parameter value to a default value prior to transmitting the audio/video data.

18. The system of claim 17, wherein the default buffering parameter value is set based on at least one of: number of participants, distance between participants, network terminal type, network terminal video capability, network terminal audio capability, network type, network transmission rate, and network transmission protocol.

19. The system of claim 12, wherein the first network terminal is further configured to store data representing at least one user-preference, and to not encode the audio/video data based on the buffering parameter value if the at least one user-preference forbids modification of the buffering parameter value.

20. The system of claim 12, wherein the first network terminal is further configured to store data representing at least one user-preference specifying a range for the buffering parameter value, and to not encode the audio/video data based on the buffering parameter value if the negotiated buffering parameter value is outside the range specified by the at least one user-preference.

21. The system of claim 12, wherein the first network terminal is further configured to determine the buffering parameter value by negotiating a range for the buffer parameter value with the second network terminal.

22. The system of claim 21, wherein the first network terminal is further configured to not encode the audio/video data based on the buffering parameter value if the negotiated buffering parameter value is outside the negotiated range.

23. A terminal device comprising:
a memory system storing processor-executable instructions;
a processing system coupled to the memory system and configured to execute the processor-executable instructions;
a network interface coupled to the processing system and configured to communicate over a network;
wherein the processor-executable instructions are configured to cause the processing system to:
receive input audio/video data;
set a value of a buffering parameter;
buffer the received audio/video data based on the buffering parameter value;
encode the buffered audio/video data based on the buffering parameter value;
transmit the encoded audio/video data over the network to a destination network terminal;
receive first performance data representing a capacity of a computing resource of the terminal device;
receive second performance data representing performance of the transmission of the encoded audio/video data over the network; and
modify the buffering parameter based on the first performance data and the second performance data,
wherein modifying the buffering parameter value includes negotiating the buffering parameter value with the destination network terminal.

* * * * *